United States Patent
Winter et al.

(10) Patent No.: US 10,605,309 B2
(45) Date of Patent: Mar. 31, 2020

(54) SNAP-IN BEARING FOR AUTOMOTIVE BALL JOINT

(71) Applicant: MEVOTECH LP, Toronto (CA)

(72) Inventors: Simon Winter, Toronto (CA); Jack McVeigh, Toronto (CA); Tyler Kearns, Toronto (CA); Rosan Luiz, Toronto (CA)

(73) Assignee: MEVOTECH LP, Toronto, Ontario (CA)

(*) Notice: Subject to any disclaimer, the term of this patent is extended or adjusted under 35 U.S.C. 154(b) by 292 days.

(21) Appl. No.: 15/433,296

(22) Filed: Feb. 15, 2017

(65) Prior Publication Data
US 2018/0231052 A1 Aug. 16, 2018

(51) Int. Cl.
| | |
|---|---|
| *F16C 35/02* | (2006.01) |
| *F16C 33/10* | (2006.01) |
| *F16C 43/02* | (2006.01) |
| *B62D 7/18* | (2006.01) |
| *F16C 33/04* | (2006.01) |
| *B62D 7/16* | (2006.01) |
| *F16C 23/04* | (2006.01) |
| *F16C 17/10* | (2006.01) |

(52) U.S. Cl.
CPC .............. *F16C 35/02* (2013.01); *B62D 7/16* (2013.01); *B62D 7/18* (2013.01); *F16C 23/046* (2013.01); *F16C 33/046* (2013.01); *F16C 33/1065* (2013.01); *F16C 43/02* (2013.01); *F16C 17/107* (2013.01); *F16C 2226/74* (2013.01); *F16C 2326/05* (2013.01)

(58) Field of Classification Search
CPC ..... Y10T 403/32672; Y10T 403/32681; Y10T 403/32704; Y10T 403/32737; Y10T 403/32771; F16C 2326/05; F16C 11/06; F16C 11/0604; F16C 11/0609; F16C 11/068; F16C 25/04; B60G 2204/416
See application file for complete search history.

(56) References Cited

U.S. PATENT DOCUMENTS

| | | |
|---|---|---|
| 1,694,681 A | 12/1928 | Bush |
| 1,918,394 A | 7/1933 | Hufferd et al. |
| 1,977,540 A | 10/1934 | Butler |

(Continued)

*Primary Examiner* — Jonathan P Masinick
(74) *Attorney, Agent, or Firm* — Norton Rose Fulbright Canada LLP

(57) ABSTRACT

A self-aligning rotating joint, for mounting in a first component and connecting to a second component, the rotating joint comprising: a housing having: an external mounting surface; an internal chamber with an internal surface forming a spherical segment symmetric about a center point; a base end with an assembly opening; and an aperture in a cap end opposite the base end; a stud having: a longitudinal axis passing through the center point; a proximal stud end housed within the internal chamber; and a distal connecting end extending through the aperture, the proximal end having a cylindrical surface and a head laterally extending from the cylindrical surface; and a longitudinally split bearing having: an external bearing surface matching the internal surface of the housing; an internal bearing surface matching the cylindrical surface of the stud; and a longitudinal channel extending radially from the internal bearing surface to the external bearing surface.

12 Claims, 5 Drawing Sheets

(56) References Cited

U.S. PATENT DOCUMENTS

| | | | |
|---|---|---|---|
| 2,841,428 A | 7/1958 | Moskovitz | |
| 2,913,251 A | 11/1959 | Herbenar | |
| 2,936,188 A * | 5/1960 | Moskovitz | B60G 7/005 |
| | | | 403/139 |
| 3,104,117 A * | 9/1963 | Pierce | B60G 3/20 |
| | | | 280/124.136 |
| 3,403,932 A | 10/1968 | Kutcher | |
| 3,539,234 A * | 11/1970 | Rapata | F16C 11/06 |
| | | | 384/203 |
| 3,831,244 A * | 8/1974 | Amos | B23K 11/04 |
| | | | 29/898.053 |
| 4,101,227 A | 7/1978 | Herbenar et al. | |
| 4,154,544 A * | 5/1979 | Gain | B60G 7/005 |
| | | | 403/131 |
| 4,415,291 A * | 11/1983 | Smith | F16C 11/0619 |
| | | | 403/36 |
| 4,629,352 A * | 12/1986 | Nemoto | B60G 7/005 |
| | | | 403/128 |
| 4,765,770 A | 8/1988 | Buhl | |
| 4,938,121 A * | 7/1990 | Melchior | F16J 1/22 |
| | | | 92/110 |
| 5,040,817 A * | 8/1991 | Dunn | B60D 1/065 |
| | | | 280/504 |
| 5,464,296 A * | 11/1995 | Broszat | F16C 11/0647 |
| | | | 403/120 |
| 5,655,848 A * | 8/1997 | Catron | F16C 11/0604 |
| | | | 403/124 |
| 5,860,728 A * | 1/1999 | Maglica | B62J 6/00 |
| | | | 362/191 |
| 6,010,272 A * | 1/2000 | Littman | F16C 11/0604 |
| | | | 403/129 |
| 6,059,480 A * | 5/2000 | Maughan | F16C 11/0609 |
| | | | 403/122 |
| 6,338,589 B1 * | 1/2002 | Kincaid | B60G 21/0551 |
| | | | 403/130 |
| 6,371,682 B1 * | 4/2002 | Maughan | B62D 7/16 |
| | | | 280/93.508 |
| 6,676,325 B2 | 1/2004 | Schmidt et al. | |
| 6,857,810 B2 * | 2/2005 | Ersoy | F16C 11/0604 |
| | | | 280/93.511 |
| 7,037,023 B2 * | 5/2006 | Monninghoff | F16C 11/0638 |
| | | | 403/122 |
| 7,344,311 B2 * | 3/2008 | Lu | F16C 11/04 |
| | | | 384/192 |
| 7,452,154 B2 * | 11/2008 | Aoshima | F16B 21/082 |
| | | | 362/514 |
| 7,600,940 B1 * | 10/2009 | Byrnes | F16C 11/0623 |
| | | | 403/131 |
| 8,047,739 B2 | 11/2011 | Sellers et al. | |
| 8,453,787 B2 * | 6/2013 | Rager | B60G 9/022 |
| | | | 180/352 |
| 8,668,214 B2 * | 3/2014 | Elliott | B60B 35/004 |
| | | | 180/352 |
| 9,056,538 B2 * | 6/2015 | Kuroda | B60G 7/005 |
| 9,157,471 B2 * | 10/2015 | Jungeberg | F16C 11/0604 |
| 9,765,811 B2 * | 9/2017 | Karpman | F16C 11/0609 |
| 9,925,838 B2 * | 3/2018 | Karpman | B60G 7/005 |
| 10,012,261 B2 * | 7/2018 | Jungeberg | F16C 11/0604 |
| 2009/0003927 A1 * | 1/2009 | Howes | B60G 7/005 |
| | | | 403/131 |

* cited by examiner

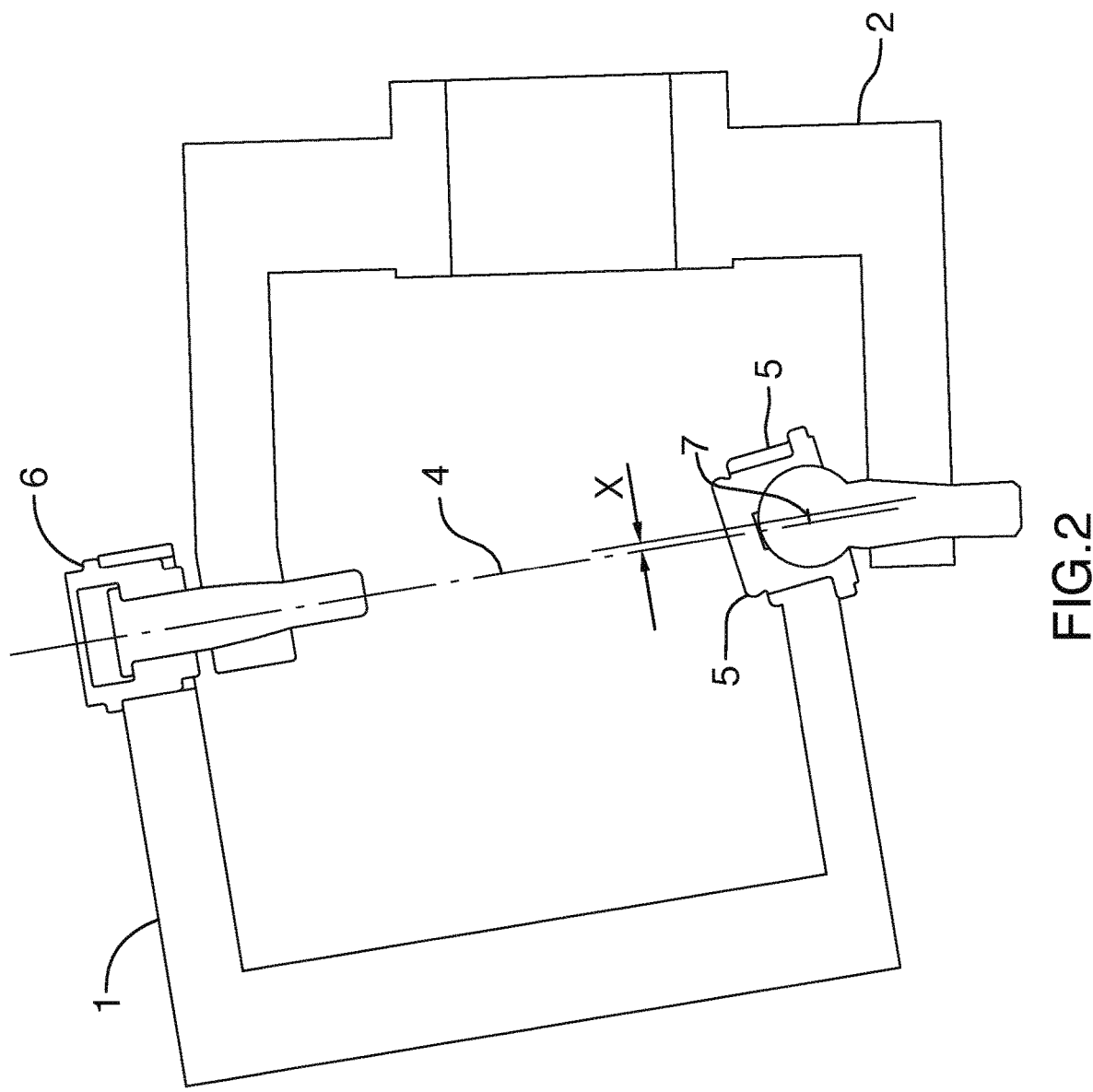

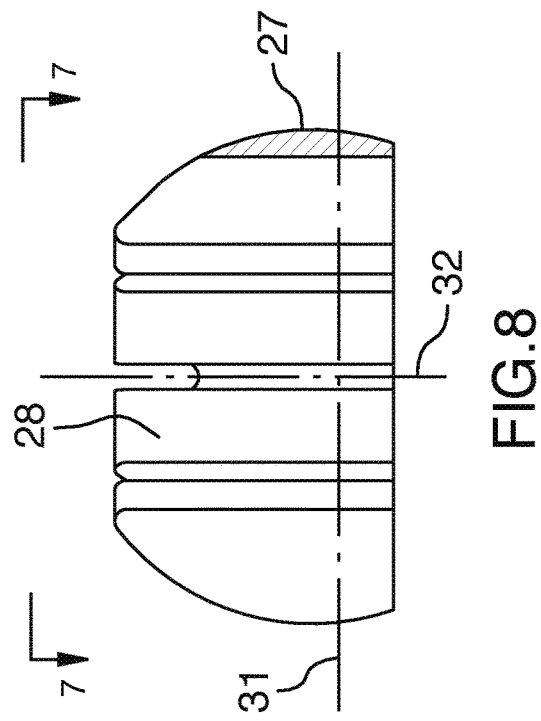
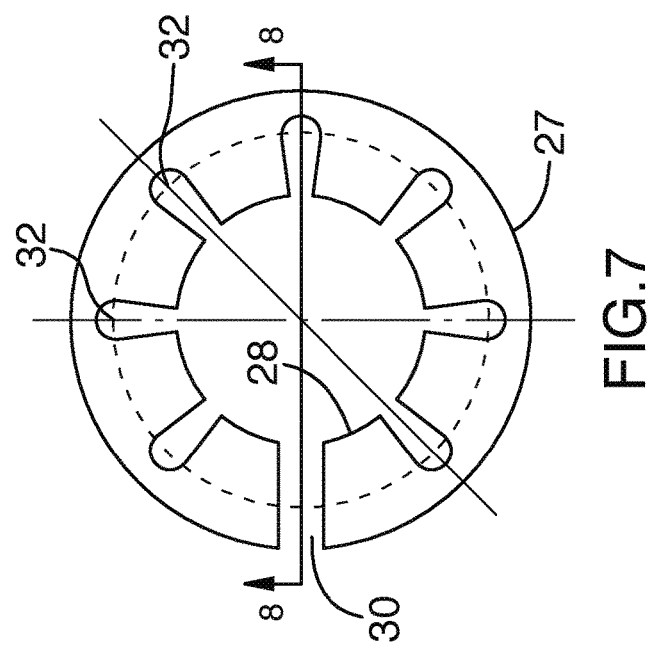
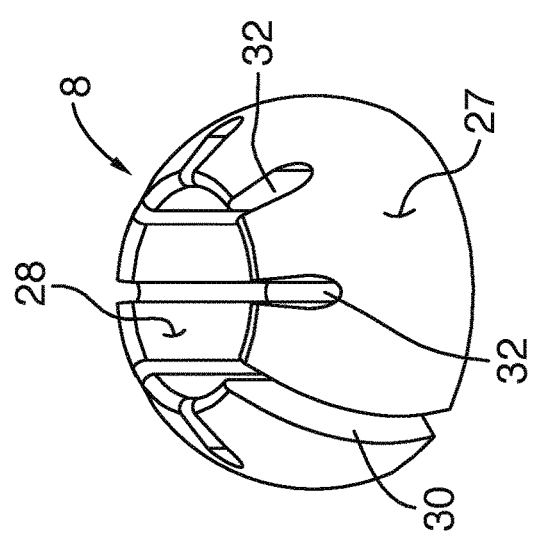

SNAP-IN BEARING FOR AUTOMOTIVE BALL JOINT

TECHNICAL FIELD

The invention relates a split self-aligning snap-in bearing for an automotive rotating joint that enables the joint stud to slide axially, to rotate and to swing through a limited angle thereby providing a self-alignment capacity.

BACKGROUND OF THE ART

Solid axle suspension can suffer from binding or memory steer of the steering joint as a result of misalignment of the supporting rotational joints. The service life of the rotational joints can be reduced due to the increased wear caused by misalignment.

A solid axle suspension, as opposed to independent suspension, is commonly used in larger vehicles such as trucks, vans and sport utility vehicles. The solid axle requires the wheel hub to rotate about an axis to provide steering. Two rotational joints connect a center axle along the rotational axis to the wheel yoke that houses the wheel hub.

The pair of rotational joints that connect the center axle and yoke are usually found in two configurations, namely a pair of conventional ball joints and alternatively a single ball joint combined with a rotating joint that only rotates and can move axially (translate along the rotational axis). Axial motion or translation is required for proper installation to allow movement of the rotational stud when assembling the yoke and center axle together.

The axis of rotation of the stud, in the rotational joint, also determines the axis of rotation of the yoke-center axle assembly. Accordingly the pair of joints must align on the same rotational axis. To allow the yoke to rotate on the center axle, the spherical center of the ball joint must lie on the rotational axis of the rotational joint.

FIG. 1 is an exploded isometric view of a prior art automotive solid axle with a suspension center axle 1, and yoke 2 housing the wheel hub 3. The center axle 1 and yoke 2 are connected at and rotate about a rotational axis 4 on two rotatable joints 5, 6. FIG. 2 is a schematic sectional view through the prior art center axle 1 and yoke 2 along the axis of rotation 4, showing a misalignment of the spherical center 7 of the upper ball joint 5 and the rotation axis 4 of the lower rotatable joint 6. FIG. 2 shows the misalignment as dimension "x". The misalignment can cause an issue commonly referred to as memory steer.

When the ball joint 5 and the rotational axis 4 are misaligned, the rotating joint 6 experiences forces and stresses which lead to premature failure. To compensate for the misalignment, original equipment manufacturers often use malleable materials such as plastic for bearings to permit a degree of deformation under stress and allow the pair of joints to self-align. The deformation allows the joints to align and mitigates any significant memory steer. However deformation of plastic bearings also shortens the service life of the rotating joint.

Further use of plastic bearings may permit self-alignment under stress, and be less expensive but plastic bearings have a shorter service life than metal bearings in general even without misalignment, and plastic bearings can be easily damaged by high loads, heat and impact.

Features that distinguish the present invention from the background art will be apparent from review of the disclosure, drawings and description of the invention presented below.

DISCLOSURE OF THE INVENTION

The invention provides a self-aligning rotating joint, for mounting in a first component and connecting to a second component, the rotating joint comprising: a housing having: an external mounting surface; an internal chamber with an internal surface forming a spherical segment symmetric about a center point; a base end with an assembly opening; and an aperture in a cap end opposite the base end; a stud having: a longitudinal axis passing through the center point; a proximal stud end housed within the internal chamber; and a distal connecting end extending through the aperture, the proximal end having a cylindrical surface and a head laterally extending from the cylindrical surface; and a longitudinally split bearing having: an external bearing surface matching the internal surface of the housing; an internal bearing surface matching the cylindrical surface of the stud; and a longitudinal channel extending radially from the internal bearing surface to the external bearing surface.

DESCRIPTION OF THE DRAWINGS

In order that the invention may be readily understood, one embodiment of the invention is illustrated by way of example in the accompanying drawings.

FIGS. 1 and 2 show prior art assemblies as described above.

FIG. 6 shows an isometric view of the split snap-in spherical bearing having a longitudinal channel extending axially and radially between the external spherical bearing surface and the internal cylindrical axial motion bearing surface.

FIG. 7 is a top view of the bearing of FIG. 6 along line 7-7 shown in FIG. 8.

FIG. 8 is an axial sectional view through the bearing of FIGS. 6-7 along line 8-8 shown in FIG. 7.

Further details of the invention and its advantages will be apparent from the detailed description included below.

DETAILED DESCRIPTION OF PREFERRED EMBODIMENTS

Figure 1:
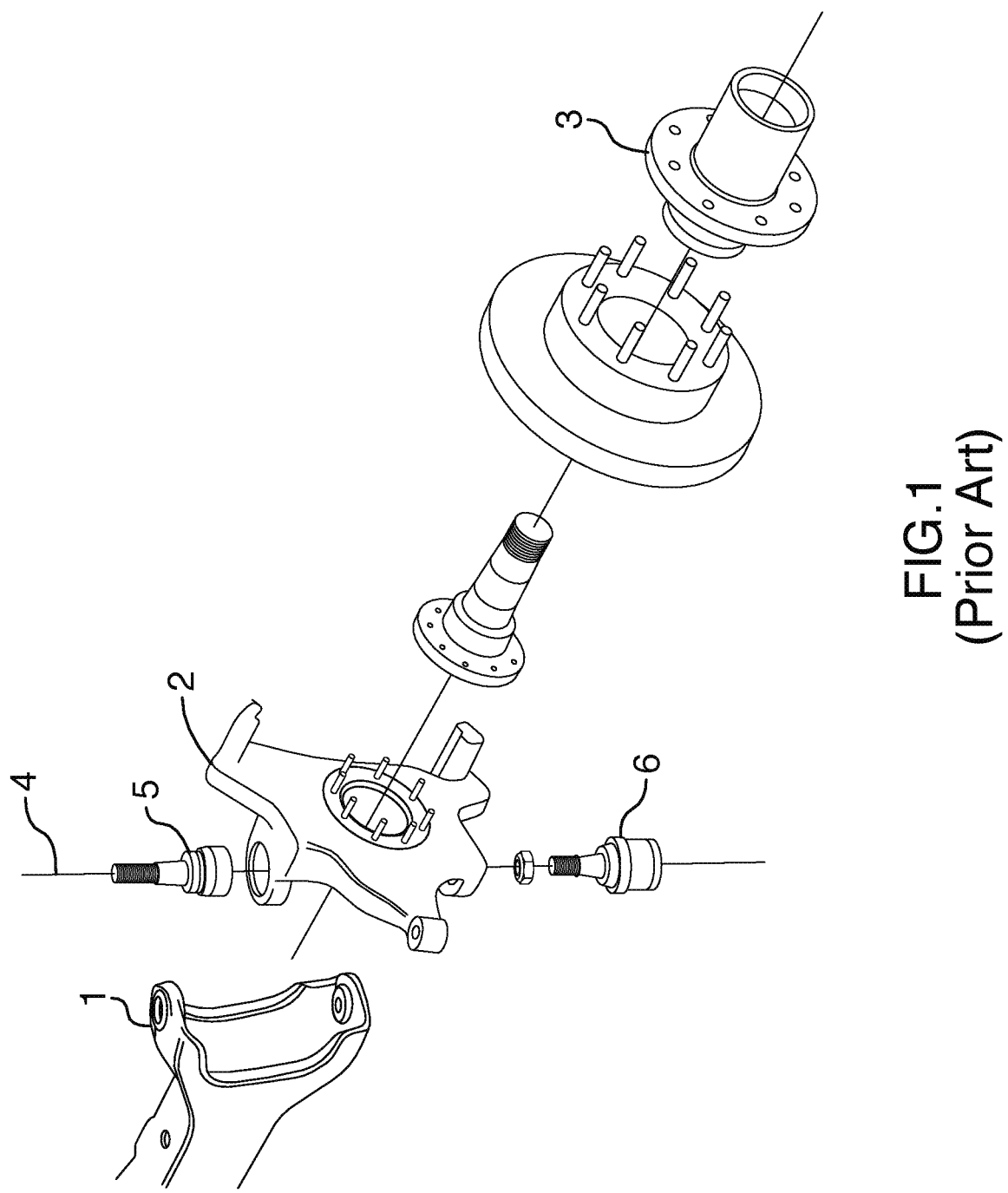
Figure 5:
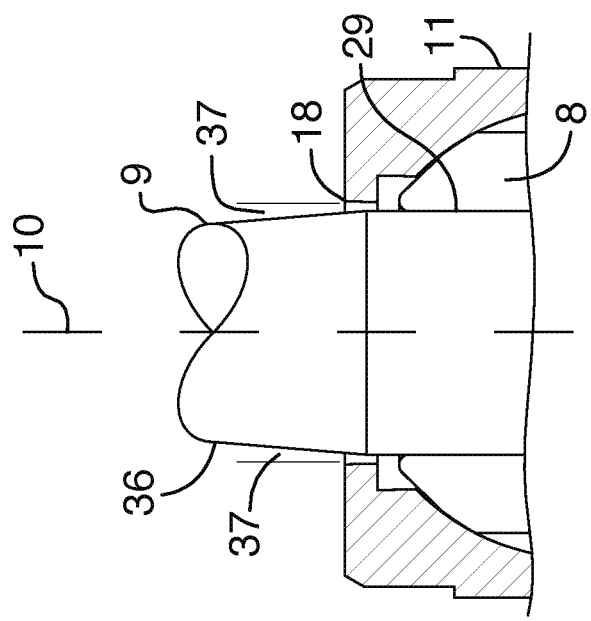
FIGS. 3, 4 and 5 illustrate, respectively in an outer isometric view, an axial sectional view and a detail axial sectional view, a self-aligning rotating joint in accordance with an embodiment of the invention having a split snap-in spherical bearing with a cylindrical inner bearing surface to permit the stud to rotate, slide axially (or translate) and to swing (or pivot) through a limited angular motion.
Figure 4:
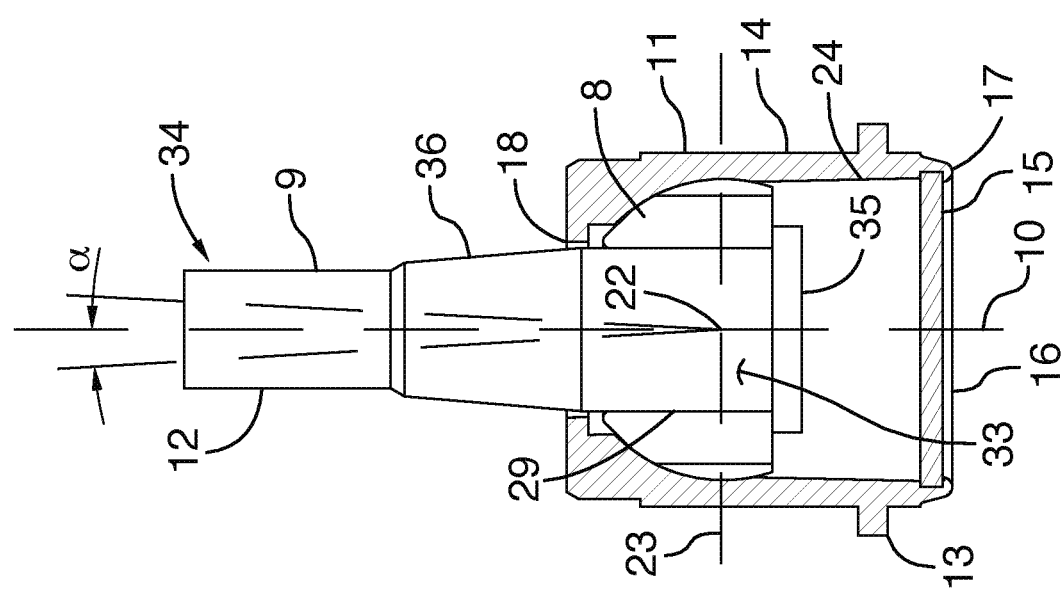
Figure 3:
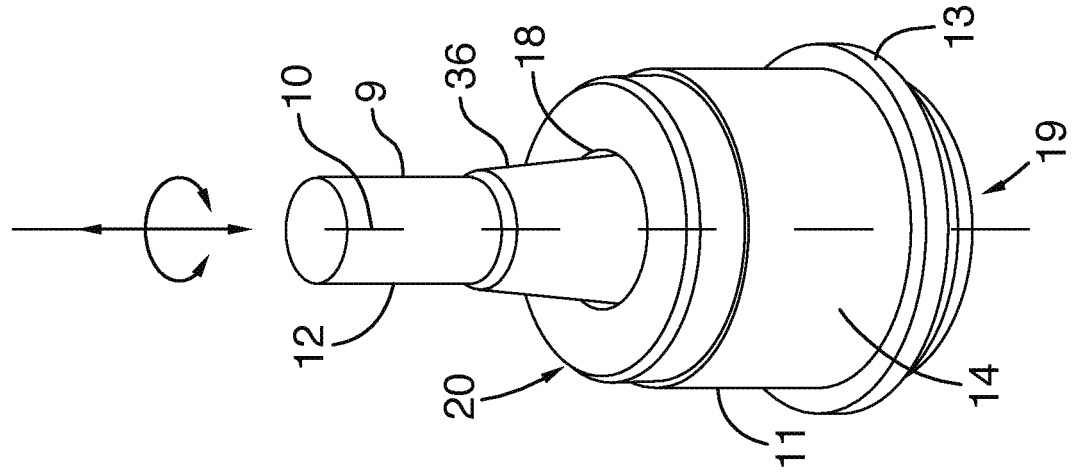

FIGS. 3-5 show the general arrangement of a self-aligning rotational joint having a spherical longitudinally split bearing 8 that allows the stud 9 to swing through a limited angle α relative to the axis of rotation 10. The stud 9 freely rotates about the axis of rotation 10 and also translates axially relative to the bearing 8 as described below and indicated with arrows in FIG. 3.

The self-aligning rotating joint has a housing 11 that is press fit mounted in a first component (such as one of the yoke 2 or center axle 1) and connects to a second component (such as the other of the center axle 1 or yoke 2) using a threaded distal end 12 of the stud 9 with a nut (not shown). The housing 11 includes an abutment flange 13 extending laterally outward from the external mounting surface 14 that is press fit into a matching bore in a yoke 2 or center axle 1 in a conventional manner. The housing 11 has a closure plate 15 disposed in an assembly opening 16 and a peripheral roll formed edge 17 that secures the closure plate 15 also in a conventional manner. The closure plate 15 seals the interior of the housing 11 and the bearing 8 is immersed in lubricant.

Figure 9:
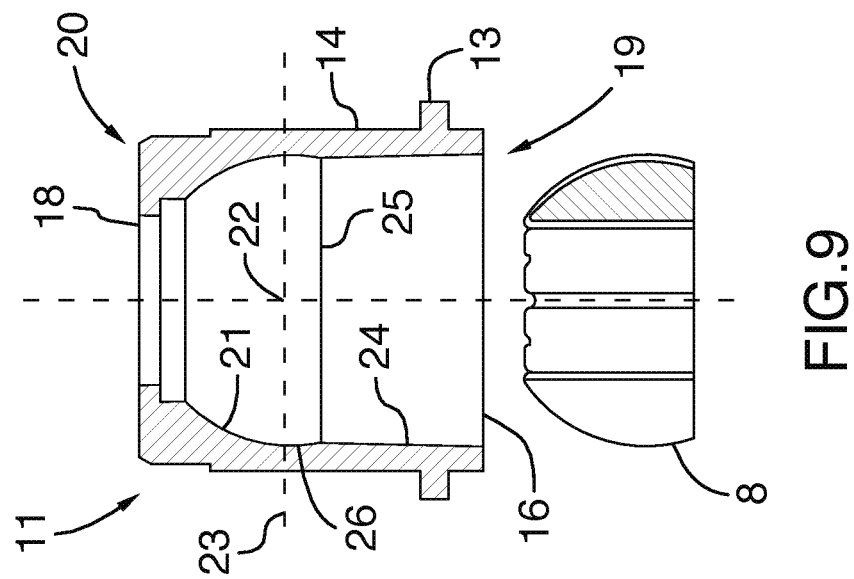

The housing 11 is best seen in isolation in FIG. 9. The external housing features described above include the external mounting surface 14, the abutment flange 13, the assembly opening 16 in a base end 19 of the housing 11 (without closure plate 15 and rolled formed edge 17 seen in FIG. 4) and an aperture 18 in a cap end 20 through which the stud 9 projects (FIGS. 3-5).

As seen in FIG. 9, the housing 11 has an internal chamber between the assembly opening 16 and aperture 18 with an internal surface forming a spherical segment 21 symmetric about a center point 22. The internal chamber has a maximum lateral width along an equatorial plane 23 of the spherical segment 21 that passes through the center point 22. The internal chamber also includes an assembly portion 24 between the spherical segment 21 and the assembly opening 16.

Figure 11:
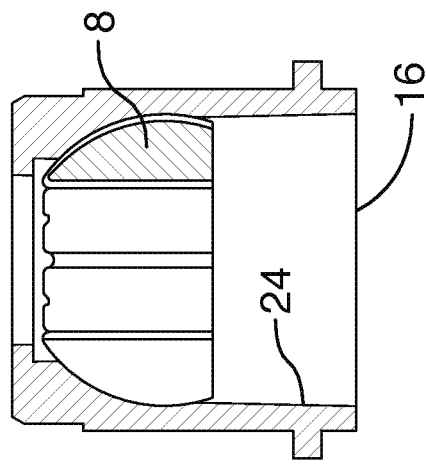
FIGS. 9, 10, and 11 show the axial snap-in insertion of the bearing into the housing in progressive axial sectional views.
Figure 10:
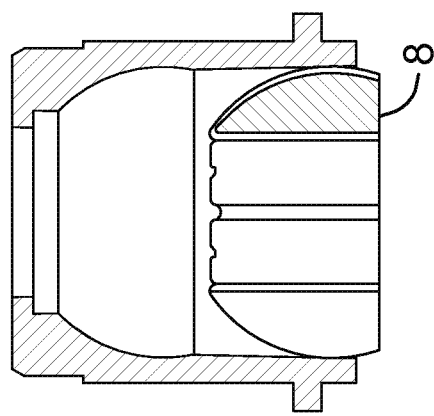

The spherical segment 21 between the equatorial plane 23 and the inner edge 25 of the assembly portion 24 forms a spherical bearing detent surface 26 which retains the split bearing 8 in a snap-in progressive installation demonstrated in FIGS. 9 to 11. The assembly portion 24 as drawn has a conical surface tapering radially inward from the assembly opening 16 to the inner edge 25 where the bearing detent surface 26 begins to open radially outward. A cylindrical surface could be used for the assembly portion 24 since the spherical surface of the split bearing 8 serves to compress the bearing 8 when inserted into the assembly portion 24.

FIGS. 6-8 show the detailed structure of the longitudinally split bearing 8. The split bearing 8 is preferably made of sintered metal to provide wear resistance and extended service life. However, the split bearing 8 cold be made of any suitable material such as: ferrous metal; non-ferrous metal; copper; aluminum; tungstenium; sintered metal; rubber compounds; ceramic; polymer; polyacetal; polytetrafluoroethylene (PTFE); graphite; and composites thereof. In the embodiment illustrated the self-aligning split bearing 8 includes oil distribution grooves 32 on the internal bearing surface 28. Oil distribution grooves 32 could also be provided on the external bearing surface 27 if desired.

The bearing 8 has an external spherical bearing surface 27 matching the spherical segment 21 of the internal surface of the housing 11. The bearing 8 has an internal bearing surface 28 matching the cylindrical surface 29 (see FIGS. 4-5) of the stud 9. A longitudinal channel 30 extends radially from the internal bearing surface 28 to the external bearing surface 27 and splits the bearing 8 axially so that the bearing 8 can flex slightly when compressed laterally.

Referring to FIG. 8, the external bearing surface 27 of the split bearing 8 has a maximum lateral width along an equatorial plane 31. As seen in FIGS. 4 and 8, the spherical external bearing surface 27 extends axially toward the assembly opening 16, and extends axially in the opposite direction toward the aperture 18.

The longitudinal channel 30 and the maximum lateral width along the equatorial plane enable the split bearing 8 to flex slightly as the bearing 8 is compressed laterally in order to be snap-locked and to be secured into position within the spherical segment 21 by the bearing detent surface 26. FIGS. 9-11 show the axial snap-in insertion of the bearing 8 into the housing 11 in progressive axial sectional views from left to right. The split bearing 8 when engaged in the conical assembly portion 24 of the housing 11 as shown in FIG. 10, and pressed axially, is compressed laterally as the bearing 8 slides towards the aperture 18. When fully inserted, as shown in FIG. 11, the split bearing 8 rebounds laterally outward into the spherical segment 21 which is slightly larger radially than the assembly portion 24. The narrowing of the spherical portion between the equatorial plane 23 and the inner edge 25 defines the bearing detent surface 27 that engages and retains the external bearing surface 27 of the split bearing 8.

Referring to FIGS. 3-4, the internal surface 28 of the bearing 8 engages the cylindrical surface 29 of the stud 9 and with lubricant permits the stud 9 to rotate and translate axially relative to the housing 11. The stud 9 has a longitudinal axis 10 passing through the center point 22 on the equatorial plane of the spherical segment 21 and split bearing 8. As drawn, the proximal stud end 33 is downward and is housed within the internal chamber of the housing 11. The upper or distal connecting end 34 of the stud is threaded for receiving a connecting nut and extends through the aperture 18 in the upper or cap end of the housing 11. The proximal end 33 of the stud 9 has a cylindrical surface 29 matching the internal bearing surface 28 of the split bearing 8. The proximal end 33 of the stud 9 includes a head 35 laterally extending from the cylindrical surface 29 to abut the bearing 8 preventing axial motion in one direction (up as drawn) while space within the assembly portion 24 of the housing 11 permits a range of axial motion in the opposite (down) direction. The freedom of axial movement of the head 35 between the closure plate 15 and the bearing 8 enables the stud 9 to compensate for geometric variance within tolerances for manufacturing and assembly, and to allow the stud 9 to be assembled into connecting components.

The stud 9 includes a middle portion 36 having a conical surface that tapers radially inward from the cylindrical surface 29 of the proximal end 33 to the distal connecting end 34. The middle portion 36 could also be cylindrical. As seen in the detail of FIG. 5, the aperture 18 in the housing 11 has a diameter larger than the diameter of the stud 9 thereby defining an annular clearance gap 37 surrounding the stud 9 to allow a predetermined angle α of roll and pitch movement of the stud 9.

The roll and pitch movement of the stud 9 in the direction indicated with angle α is permitted by the interaction between the spherical external bearing surface 27 and the spherical segment 21 of the housing 11. Roll and pitch about the center point 22 allows the rotating stud 9 to self-align thereby avoiding the misalignment "x" with a companion ball joint 5 indicated in FIG. 2. Accordingly, the movement through angle α allows the rotating bearing to self-align with the companion ball joint and eliminate the disadvantages of memory steer.

Although the above description relates to a specific preferred embodiment as presently contemplated by the inventors, it will be understood that the invention in its broad aspect includes mechanical and functional equivalents of the elements described herein.

We claim:

1. A self-aligning rotating joint, for mounting in a first component and connecting to a second component, the rotating joint comprising:

a housing having: an external mounting surface; an internal chamber with an internal surface forming a spherical segment symmetric about a center point; a base end with an assembly opening; and an aperture in a cap end opposite the base end;

a stud having: a longitudinal axis passing through the center point; a proximal stud end housed within the internal chamber; and a distal connecting end extending through the aperture, the proximal end having a cylindrical surface and a head laterally extending from the cylindrical surface; and a longitudinally split bearing having: an external bearing surface matching the internal surface of the housing; an internal bearing surface matching the cylindrical surface of the stud configured to permit the stud to rotate about its longitudinal axis and translate axially relative to the housing; and a longitudinal channel extending radially from the internal bearing surface to the external bearing surface wherein the internal chamber has a maximum lateral width along an equatorial plane of the spherical segment, and includes an assembly portion between the spherical segment and the assembly opening, the spherical segment between the equatorial plane and the assembly portion comprising a bearing detent surface.

2. The self-aligning rotating joint according to claim 1, wherein the assembly portion has one of: a cylindrical surface; and a conical surface tapering radially inward from the assembly opening to the bearing detent surface.

3. The self-aligning rotating joint according to claim 1, wherein the external bearing surface of the split bearing has a maximum lateral width along an equatorial plane of the external bearing surface, extends axially toward the assembly opening, and extends axially toward the aperture.

4. The self-aligning rotating joint according to claim 3, wherein at least one of the internal bearing surface and the external bearing surface includes oil distribution grooves.

5. The self-aligning rotating joint according to claim 1, wherein the split bearing is made from one of:

ferrous metal; non-ferrous metal; copper; aluminum; tungstenium; sintered metal; rubber compounds; ceramic;

polymer; polyacetal; polytetrafluoroethylene (PTFE); graphite; and composites thereof.

6. The self-aligning rotating joint according to claim 1, wherein the stud includes a middle portion having one of: a cylindrical surface; and a conical surface tapering radially inward from the cylindrical surface of the proximal end to the distal connecting end.

7. The self-aligning rotating joint according to claim 6, wherein the aperture has a diameter larger than a diameter of the stud thereby defining an annular clearance gap surrounding the stud to allow a predetermined angle of roll and pitch stud movement.

8. The self-aligning rotating joint according to claim 1, wherein the housing includes a closure plate disposed in the assembly opening and a peripheral roll formed edge securing the closure plate.

9. The self-aligning rotating joint according to claim 8, wherein the housing includes an abutment flange extending laterally outward from the external mounting surface.

10. The self-aligning rotating joint according to claim 8, wherein the head is configured to translate axially between the closure plate and the longitudinally split bearing.

11. The self-aligning rotating joint according to claim 1, wherein the bearing detent surface narrows radially between the equatorial plane and an inner edge of the assembly portion defining a portion of the bearing detent surface that engages and retains the external bearing surface of the longitudinally split bearing.

12. The self-aligning rotating joint according to claim 1, wherein the longitudinally split bearing rebounds laterally outward into the spherical segment when inserted into the spherical segment from the assembly portion.

\* \* \* \* \*